United States Patent [19]
Tatami et al.

[11] Patent Number: 4,729,013
[45] Date of Patent: Mar. 1, 1988

[54] TIME BASE ERROR CORRECTOR

[75] Inventors: Mitsushige Tatami; Yasuo Sakura; Yoshinori Suzuki, all of Kanagawa, Japan

[73] Assignee: Sony Corporation, Tokyo, Japan

[21] Appl. No.: 863,422

[22] Filed: May 15, 1986

[30] Foreign Application Priority Data

May 21, 1985 [JP] Japan .................. 60-109999

[51] Int. Cl.$^4$ ............................... H04N 9/44
[52] U.S. Cl. .................................... 358/19
[58] Field of Search .................... 358/17–19, 358/320, 324, 325, 326

[56] References Cited

U.S. PATENT DOCUMENTS

| | | | |
|---|---|---|---|
| 4,101,926 | 7/1978 | Dischort | 358/17 |
| 4,145,705 | 3/1979 | Yoshinaka | 358/8 |
| 4,178,607 | 12/1979 | Mikado | 358/17 |
| 4,212,027 | 7/1980 | Lemoine | 358/17 |
| 4,646,136 | 2/1987 | Kouyama | 358/19 |

FOREIGN PATENT DOCUMENTS

53-46224 4/1978 Japan .

Primary Examiner—Michael A. Masinick
Attorney, Agent, or Firm—Ronald P. Kananen

[57] ABSTRACT

A time base error corrector comprises a chrominance subcarrier phase corrector whereby the subcarrier phase of a video signal is controlled before being written in the buffer memory in such a way that when the video signal is read from the buffer memory on the basis of the reference video signal, the subcarrier phase of the read video signal may match that of the reference video signal. In the NTSC system, the succeeding line odd-/even (O/E) identification is predicted on the basis of a content O/E of the preceding field identification and a content O/E of the preceding field top line identification, and a non-inverted return subcarrier signal is generated when the succeeding top line identification is determined to be odd but an inverted return subcarrier signal RSC is generated when determined to be even. In the PAL system, the succeeding line O/E odd/even and I/N inversion/non-inversion identifications are predicted to generate four different return subcarrier signals. The above control is effective when a VTR is servo-controlled in such a way that the reproduced video signal is written in the buffer memory in advance of the reference video signal in phase.

6 Claims, 9 Drawing Figures

FIG.2 PAL TIME BASE ERROR CORRECTOR

NTSC BURST SIGNAL

PAL BURST SIGNAL

FIG. 4 NTSC REFERENCE VIDEO SIGNAL (A) LINE ID
(B) FIELD ID
(C) TOP LINE ID

FIG. 6 PAL REFERENCE VIDEO SIGNAL (A) LINE ID
(B) FIELD ID
(C) TOP LINE ID

FIG. 9 BUFFER MEMORY

TIME BASE ERROR CORRECTOR

BACKGROUND OF THE INVENTION

1. Field of the Invention

The present invention relates generally to a time base error corrector and more specifically to a chrominance subcarrier phase corrector incorporated in a time base error corrector available for a video tape recorder (VTR) operated, in particular, in a chrominance subcarrier return mode such that a write pulse supplied from a phase locked loop circuit (PLL) to a time base error corrector (TBC) is feedbacked to an automatic phase controller (APC) of the VTR.

2. Description of the Prior Art

In a so-called low band conversion recording system VTR such that the chrominance subcarrier of a color TV signal is recorded in a magnetic tape after having been frequency converted to the low band side of the luminance signal, a frequency converter for inversely converting the frequency of the subcarrier to the high band side of the luminance signal in a reproduction mode is incorporated in a loop of the automatic phase controller (APC circuit), so that when the frequency of the chrominance signal is inversely converted, the phase of the chrominance signal is locked to the phase of the oscillation output of the reference oscillator by the APC circuit.

The chrominance signal thus inversely frequency converted is added to the luminance signal reproduced from the magnetic tape and then outputted as a composite video reproduction signal for the VTR.

In order to eliminate jitter included in the composite video reproduction signal outputted from the VTR as described above, conventionally time base error correctors (TBC) have been used such that the composite video reproduction signal of the VTR is written in the buffer memory in response to a write pulse signal including jitter, but the stored data are read out in response to a read pulse signal formed on the basis of the reference video signal in order to obtain the composite video signal synchronized with the reference video signal and including no jitter.

In this conventional time base error corrector, the oscillation output of a phase locked loop (PLL circuit) for receiving the horizontal synchronizing signal included in the composite video reproduction signal outputted from the VTR is used as the write pulse signal for the buffer memory, and the write pulse signal including jitter is formed on the basis of the locking operation of this PLL circuit to the horizontal synchronizing signal.

In the system configuration as described above, since the chrominance signal reproduced from the magnetic tape is phase locked by the APC circuit, no jitter is included in the chrominance signal obtained from the APC circuit. However, if the time base error correction is made by the TBC on the basis of jitter for the chrominance signal, jitter is included in the chrominance signal.

To overcome these problems, as disclosed in Japanese Published Unexamined Pat. No. 53-46224 for instance, a method of feedbacking the write pulse signal supplied from the PLL circuit to the TBC to the APC to the VTR has conventionally been adopted as a return subcarrier system. In this system, the return subcarrier signal supplied from the PLL circuit to the VTR is added to an oscillation output of a variable frequency oscillator which constructs the APC circuit of the VTR, and then supplied to the frequency converter, so that jitter can be included in the chrominance signal whose frequency is inversely converted, by controlling the output frequency of the frequency converter according to frequency fluctuations of the return subcarrier signal including jitter.

In the TBC configured as described above, however, since the principle is based upon the fact that the timing of the synchronizing signal included in the video signal after time base error has been corrected and the phase of the burst signal are both replaced by the reference video signal, the chrominance burst signal (referred to as a burst signal) included in the output video signal should match in phase the burst signal included in the reference video signal. Therefore, it may be possible to discriminate whether or not the signal is replaced correctly by comparing the phase of the burst signal included in the video signal read out of the buffer memory with the phase of the burst signal included in the reference video signal. However, even when the system is thus configured, there still exists a problem in that since the chrominance signal for the succeeding line has already been written in the buffer memory when the mismatching in phase is detected between the two, there are time intervals during which the burst signal of the output video signal does not match in phase the burst signal of the reference video signal with respect to the chrominance signals for the lines already written in the buffer memory. Thus, it is impossible to obtain correct color during the above mismatching time intervals.

On the other hand, in the TBC, in order to read the video signal from the buffer memory after the video signal outputted from the VTR has once been written in the buffer memory, the VTR is so servo-controlled that the reproduced VTR signal $V_{MIN}$ as shown in FIG. 8A is advanced in phase with respect to the reference video signal $V_{REF}$ as shown in FIG. 8B. In this method, when seeing the n-th line Ln by taking the line immediately after the vertical synchronizing signal VSYNC as a top line, the reproduced video signals $V_{MIN}$ are written in the buffer memory in the order of line address numbers 1, 2 ... from the top line as shown in FIG. 9 and the data at the line address number n of the buffer memory BM is read at the timing of the n-th line Ln of the reference video signal $V_{REF}$. Therefore, the time base error corrected video signal $V_{TBC}$ outputted from the TBC as shown in FIG. 8C can read the corresponding n-th line data from the buffer memor BM at the n-th line Ln timing of the reference video signal $V_{REF}$. The above control is referred to as vertical phase control or V lock.

In the above-mentioned V lock VTR as described above, it is detected whether or not the phase of the burst signal included in the chrominance signal of the n-th line Ln of the time base error corrected video signal $V_{TBC}$ matches the phase of the burst signal included in the n-th line Ln of the reference video signal $V_{REF}$, at the timing of reading the n-th line Ln data of the reference video signal $V_{REF}$. In this case, when the former does not match the latter, even if the phase of the burst signal of the input video signal written in the buffer memory is corrected thereafter so as to match the phase of the burst signal of the reference video signal, with respect to the data written in the buffer memory BM from the time when the n-th line Ln data of the reproduced video signal $V_{MIN}$ has been written in the buffer memory BM to the time when the written data is read as the time base error corrected video signal $V_{TBC}$, the relative phase of the chrominance signal to the burst signal of the video signal does not match the relative phase of that to the burst signal of the reference video signal $V_{REF}$.

SUMMARY OF THE INVENTION

With these problems in mind, therefore, it is the primary object of the present invention to provide a chrominance subcarrier phase corrector for a time base error corrector whereby the phase of the chrominance subcarrier included in the input video signal is controlled, before the input video signal is written in the buffer memory, in such a way that the phase of the chrominance subcarrier included in the video signal matches that of the chrominance subcarrier included in the reference video signal when the video signal written in the buffer memory is read therefrom in response to the reference video signal.

To achieve the above-mentioned object, in the case of NTSC (National Television System Committee color television) system, a first non-inverted return subcarrier signal is generated when the succeeding top line identification is determined to be an odd number but a second inverted return subcarrier signal is generated when the succeeding top line identification is determined to be an even number, for instance, the above odd/even top line identification is predicted on the basis of the content O/E of the preceding field identification and the content O/E of the preceding field top line identification.

Further, in the case of PAL (phase alternation by line color television) system, a first return subcarrier signal is generated when two preceding top line identifications are determined to be an odd number and a non-inversion mode; a second return subcarrier signal 90 degrees out of phase with the first signal is generated when two preceding top line identifications are determined to be an even number and a non-inversion mode; a third return subcarrier signal is generated when the two preceding top line identifications are determined to be an odd number and an inversion mode; and a fourth return subcarrier signal is generated when the two preceding top line identifications are determined to be an even number and an inversion mode. The above odd/even top line identification and the above inversion/non-inversion mode top line identification are predicted on the basis of a content O/E of the preceding field identification and contents O/E and I/E of the preceding field top line identifications. Further, in this PAL system, a V-axis inversion controller is additionally incorporated to generate a control signal to match the burst signal phase and the V-axis subcarrier phase of the reproduced video signal with those of the reference video signal.

In the time base corrector according to the present invention, since the phase of the chrominance subcarrier included in the input video signal is so controlled, before being written in the buffer memory, that the phase of the chrominance subcarrier included in the read video signal matches that of the chrominance subcarrier included in the reference video signal when the video signal is read from the buffer memory in response to the reference video signal, it is possible to always realize correct color on a TV screen even if the VTR is servo-controlled in such a way that the reproduced video signal is written in the buffer memory in advance of the reference video signal in phase, that is, in the case of the so-called vertical phase control method (V lock).

BRIEF DESCRIPTION OF THE DRAWINGS

The features and advantages of the chrominance subcarrier phase corrector incorporated in a time base corrector according to the present invention will be more clearly appreciated from the following description of the preferred embodiments of the invention taken in conjunction with the accompanying drawings in which like reference numerals denote the same or similar elements or sections throughout the figures thereof and in which:

FIG. 4 is a chart showing the relationship between three series of line IDs(A), field IDs(B) and top line IDs(C) each represented by odd and even numbers in the reference video signal of the NTSC color television system;

FIG. 6 is a chart showing the relationship between three series of line IDs(A), field IDs(B) and top line IDs(C) each represented by odd and even numbers and/or non-inversion and inversion mode in the reference video signal of the PAL color television system;

FIG. 9 is a diagram showing line addresses arranged in the buffer memory.

DETAILED DESCRIPTION OF THE PREFERRED EMBODIMENTS

Embodiments of the present invention will be described hereinbelow with reference to the attached drawings. In the case of a composite video signal, the mutual phase relationship between the horizontal synchronizing signal and the burst signal (i.e. chrominance signal) is different in the standardized television systems such as NTSC (National Television System Committe) color television system, PAL (Phase Alternation by Line) color television system, etc. Therefore, the embodiments of the present invention will be described for each color television system.

(1) EMBODIMENT FOR NTSC SYSTEM

Operation Principle

Figure 3:
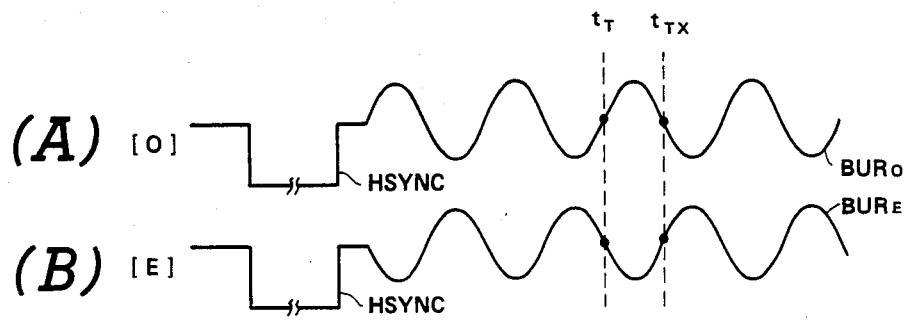
FIG. 3 is a chart showing the relationship between two waveform diagrams each representative of the phase relationship between the horizontal synchronizing signal and the burst signal of an odd line (A) and an even line (B) in the reference video signal of the NTSC color television system.

In the case of the NTSC color television system, the relative phase relationship between the burst signal and the horizontal synchronizing signal is inversed for each line. That is, in odd lines, if the burst signal $BUR_o$ is generated after the end of the horizontal synchronizing signal HSYNC in phase with the signal HSYNC, for instance, as shown in FIG. 3A, in even lines the burst signal $BUR_E$ is generated 180 degrees out of phase with the signal HSYNC as shown in FIG. 3B.

On the other hand, in a time base error corrector (referred to as TBC), a line top time point $t_T$ is previously determined to control writing and reading addresses in a buffer memory with an address at this time point $t_T$ as a top address. Therefore, it is possible to define a line identification signal (referred to as line ID) representative of the relative phase relationship between the burst signal and the horizontal synchronizing signal at each line by synchronizing the top time point $t_T$ with the zero-cross points of the burst signals $BUR_o$ and $BUR_E$. In other words, where the burst signal $BUR_o$ crosses the zero point from the negative side to the positive side at the top time point $t_T$ as shown in FIG. 3A, the line ID is defined as an odd number (represented by the symbol "O"). Where the burst signal $BUR_E$ crosses the zero point from the positive side to the negative side at the top time point $t_T$ as shown in FIG. 3B, the line ID is defined as an even number (represented by the symbol "E").

Here, it should be noted that if the line top time point $t_T$ is set at the time point $t_{TX}$ shifted by a half period of the burst signal $BUR_o$ or $BUR_E$, the definition of the ID signal (e.i., "O" and/or "E") is reversed. This means that the line ID is not an absolute definition but a relative definition. Therefore, it is possible to freely define the line ID on the basis of the line ID of the TBC reference video signal $V_{REF}$.

In the case of the reference video signal $V_{REF}$, the relationship between the line ID and the field ID (that is, an odd or even number of the field signal) is continuous as shown in FIG. 4. As shown in FIG. 4A, the line ID is switched alternately from "O" to "E" or vice versa for each line. Further, the field ID is switched alternately from "O" to "E" or vice versa for each field as shown in FIG. 4B. However, when seeing the line ID of the top line of each field (referred to as top line ID) as shown in FIG. 4C, the top line ID of each field is switched alternately from "O" to "E" or vice versa every two fields because there exists an interlaced relationship in a series of the fields.

With reference to the relationship between IDs shown in FIGS. 4A to C, it is possible to know the relationship between the top line ID of each field and the field ID of the preceding field as follows: if the field ID of the preceding field is "E", the top line ID of the succeeding field is inversed from the top line ID of the preceding field. In contrast with this, if the field ID of the preceding field is "O", the content of the top line ID of the preceding field is not changed, but remains at the top line ID of the succeeding field.

At the time point $t_{10}$ in FIG. 4, for instance, since the field ID of the preceding field is "E" in FIG. 4B, the top line ID at the time point $t_{10}$ is inversed from the content of "E" of the top line ID of the preceding field to "O".

At the succeeding field top time point $t_{11}$, since the field ID of the preceding field is "O", the top line ID of the succeeding field remains at "O" without changing from the content of "O" of the top line ID of the preceding field.

At the succeeding field top time point $t_{12}$, since the preceding field ID is "E", the succeeding field top line ID is inversed from the content "O" of the preceding field top line ID to "E".

Further, at the succeeding field top time point $t_{13}$, since the preceding field ID is "O", the succeeding field top line ID remains at "E" without changing from the content "E" of the preceding field top line ID.

By paying attention to the fact that the reference video signal $V_{REF}$ has the relationship as shown in FIG. 4, it is possible to predict the top line ID of the succeeding field on the basis of the content of the field ID of the preceding field and the content of the top line ID of the field one or more fields before the present field. Therefore, if the phase of the burst signal (i.e. subcarrier) is forcibly replaced with another phase so that when the reproduced video signal (referred to as an input video signal) is written in the buffer memory, the burst signal may have top line IDs which match the predicted "O" or "E", it is possible to realize the time base error correcting operation such that the phase of the subcarrier of the time base error corrected video signal (referred to as an output video signal) $V_{TBC}$ read out of the buffer memory is allowed to match the phase of the subcarrier of the reference video signal $V_{REF}$ at the top time point of the top line of the succeeding field.

As described above, since it is possible to determine the phase of the output video signal $V_{TBC}$ of the field one or plural fields after the present field on the basis of the information of the field one or plural fields before the present field in writing top line data of an input video signal in the buffer memory, it is possible to send out an output video signal $V_{TBC}$ having a subcarrier whose phase matches the phase of the subcarrier of the reference video signal $V_{REF}$ in reading the output video signal $V_{TBC}$ from the buffer memory.

Figure 1:
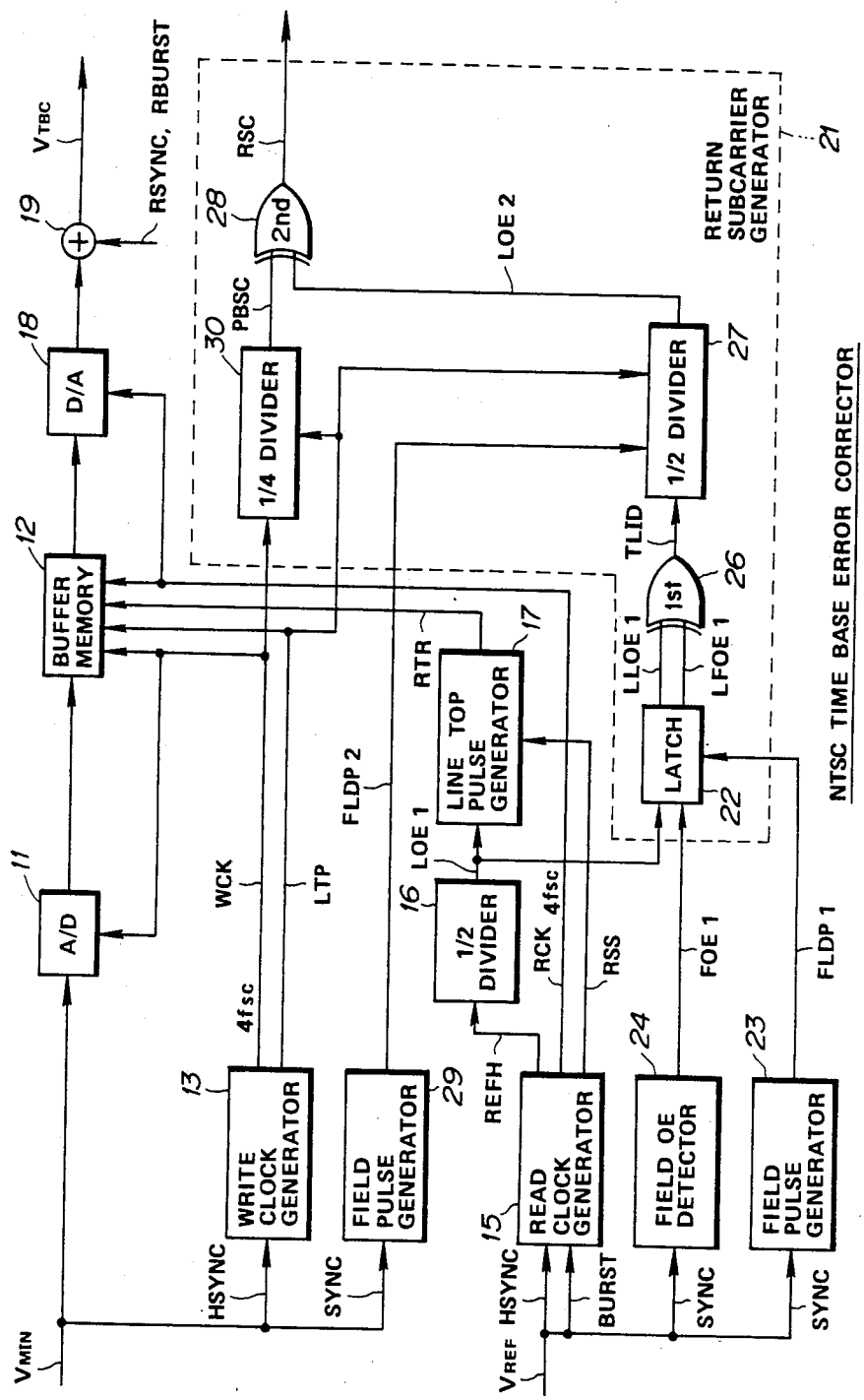
FIG. 1 is a schematic block diagram showing a first embodiment of the chrominance subcarrier phase corrector for a time base corrector applicable to the NTSC color television system.

The time base error corrector according to the present invention is so configured as to realize the above-mentioned operation as shown in FIG. 1.

Configuration of Time Base Error Corrector

In FIG. 1, an input video signal $V_{MIN}$ is converted into a digital signal by an analog-to-digital converter 11 and then written in a buffer memory 12. A write clock signal WCK used for this writing operation is generated from a write clock signal generator 13 on the basis of a horizontal synchronizing signal HSYNC included in the input video signal $V_{MIN}$, the frequency of which is selected to a frequency 4 times (i.e. 4 fsc) higher than the color subcarrier frequency.

This write clock signal generator 13 further generates a line top pulse LTP to designate a head address in the memory area for each line in the buffer memory 12.

Video data thus written in the buffer memory 12 for each line are read in sequence in response to a read clock pulse RCK generated by a read clock signal generator 15, converted into an analog signal through a digital-to-analog converter 18, added to a reference synchronizing signal RSYNC and a reference burst signal RBURST by an adder 19, and then outputted as an output video signal $V_{TBC}$.

Here, the read clock signal generator 15 receives the horizontal synchronizing signal HSYNC and the burst signal BURST both included in the reference video signal $V_{REF}$, and generates the read clock signal RCK having a frequency (4 fsc) and a reference horizontal pulse REFH having the same period as that of the horizontal synchronizing signal HSYNC. On the basis of this reference horizontal pulse REFH, a ½ divider 16 is driven to generate a line OE signal LOE1 having a period of 2H and a duty factor of ½. This line OE signal LOE1 is supplied to a line top pulse generator 17.

The line top pulse generator 17 receives a read subcarrier signal RSS generated by the read clock signal generator 15 on the basis of the burst signal BURST and supplies a line top pulse RTR to the buffer memory 12 in synchronism with a determined zero-cross point within each time interval 1H of the line OE signal LOE1 in order to designate the head read address for each line in the buffer memory 12. Thereafter, a data for each line is read out of the buffer memory 12 in sequence in response to the read clock signal RCK.

In addition to the above configuration, the time base error corrector comprises a return subcarrier generator 21. This return subcarrier generator 21 includes a latch circuit 22 for latching a top line ID (FIG. 4C) and a field ID (FIG. 4B) of the preceding field in the reference signal $V_{REF}$. This latch circuit 22 receives the line OE signal LOE1 supplied from the ½ divider 16 as a first input signal and latches the contents of the line OE signal LOE1 in response to a field pulse FLDP1 supplied from a field pulse generator 23 in such a way as to be logically "1" if the contents thereof is "E" but logically "0" if the contents thereof is "O". This field pulse generator 23 generates the field pulse FLDP1 on the basis of the synchronizing signal SYNC of the reference video signal $V_{REF}$ whenever the reference video signal $V_{REF}$ enters each field time interval.

On the other hand, this latch circuit 22 receives a field OE signal FOE1 supplied from a field OE detector 24 as a second input signal and latches this signal FOE1 in response to the field pulse FLDP1. This field OE detector 24 generates a field OE signal FOE1 whose logical level changes alternately from "1" to "0" or vice versa for each sequential field time interval on the basis of the synchronizing signal SYNC of the reference video signal $V_{REF}$. If the field OE signal FOE1 is "E" (i.e. logically "1"), this indicates that the reference video signal $V_{REF}$ is in an even field; and if "O" (i.e. logically "0"), this indicates that the $V_{REF}$ is in an odd field.

As described above, the latch circuit 22 latches the field OE signal FOE1 representative of the field ID (FIG. 4B) and the line OE signal LOE1 representative of the top line ID (FIG. 4C) at the timing of the start of each sequential field time interval.

These two latched outputs LFOE1 and LLOE1 are applied to an exclusive OR gate 26 to supply a top line ID signal TLID to a ½ divider 27 in such a way that if the field OE latch signal LFOE1 is logically "1", the logical level of the line OE latch signal LLOE1 is inversed but if the field OE latch signal LFOE1 is logically "0", the logical level of the line OE latch signal LFOE1 is outputted as it is. Therefore, this exclusive OR gate 26 outputs a top line ID signal TLID such that if the field ID is "E", the top line ID is inversed but if the field is at "O" the top line ID is not inversed.

To the ½ divider 27, a line top pulse LTP generated by the write clock signal generator 13 is applied as a clock signal. Therefore, the ½ divider 27 supplies a line OE signal LOE2 whose logical level is inversed to an exclusive OR gate 28 as a first input at the timing of the line top pulse LTP (that is, for each period of 1H) generated at each line top position of the input video signal $V_{MIN}$.

In addition, a field pulse FLDP2 outputted from a field pulse generator 29 is applied to this ½ divider 27 as a load signal. This field pulse generator 29 applies the load signal to the ½ divider 27 on the basis of the synchronizing signal SYNC included in the input video signal $V_{MIN}$ at the start point of each field time interval of the reproduced video signal $V_{MIN}$, so that it is possible to forcibly set the logical level of the line OE signal LOE2 of the present field to the logical level of the top line ID signal TLID. As a result, the line OE signal LOE2 outputted from the ½ divider 27 is operated in such a way that the logical level thereof is inversed with the logical level of the top line ID signal ILID as the initial condition.

To this exclusive OR gate 28, a reproduced subcarrier signal PBSC generated by a ¼ divider 30 is applied as a second input signal. The ¼ divider 30 receives the write clock signal WCK generated by the write clock signal generator 13 as a clock signal and the line top pulse LTP generated by the same generator 13 as a reset pulse signal. Therefore, whenever the line top pulse LTP is generated, the ¼ divider 30 outputs the reproduced subcarrier signal PBSC with the subcarrier frequency fsc in synchronism with this line top pulse LTP.

This exclusive OR gate 28 selectively inverses the logical level of the reproduced subcarrier signal PBSC according to the logical level of the line OE signal LOE2 and outputs a return subcarrier signal RSC. In more detail, when the line OE signal LOE2 is logically "0" (this indicates that the line ID is "O" as shown in FIG. 4A), the reproduced subcarrier signal PBSC is outputted as the return subcarrier signal RSC without inversion. In contrast with this, when the line OE signal LOE2 is logically "1" (this indicates that the line ID is "E"), the reproduced subcarrier signal PBSC is inversed and outputted as the return subcarrier signal RSC. As described above, since the logical level of the return subcarrier signal RSC is inversed, the phase of the return subcarrier signal RSC is inversion controlled in response to the line OE signal LOE2.

Operation

In the system configuration as shown in FIG. 1, whenever the line ID of the reference video signal $V_{REF}$ is inversed from "O" to "E" or vice versa for each line in sequence as shown in FIG. 4A, the logical level of the line OE signal LOE1 from the ½ divider 16 is inversed. Further, the field OE signal FOE1 from the field OE detector 24 is inversed according to the field ID (FIG. 4B).

Under these conditions, when the field pulse FLDP1 is generated by the field pulse generator 23 at the preceding field at the time point $t_{10}$ in FIG. 4, for instance, the latch circuit 22 latches the line OE signal LOE1 having the content "E" of the top line ID as the top line ID (FIG. 4C) and also the content "E" of the field OE signal FOE1 representative of the field ID.

Therefore, since the field OE latch signal LFOE1 and the line OE latch signal LLOE1 of the latch circuit 22 are both logically "1" (i.e. "E"), the exclusive OR gate 26 is in the state where a top line ID signal TLID of logically "0" level is outputted to the ½ divider 27.

Under these conditions, when the field pulse FLDP2 is then generated by the field pulse generator 29 near the time point $t_{10}$, the ½ divider 27 loads the top line ID signal TLID of logically "0" level and executes the ½ division operation whenever the line top pulse LTP is received. Therefore, the line OE signal LOE2 controls the exclusive OR gate 28 in such a way that the top line ID of the field becomes "0", so that the reproduced subcarrier signal PBSC is outputted as it is as the return subcarrier signal RSC without phase inversion.

This return subcarrier signal RSC is returned to an additional APC circuit for the chrominance signal of the VTR in order to control the phase of the chrominance signal of the reproduced video signal $V_{MIN}$ outputted from the VTR to the phase of the return subcarrier signal RSC.

In the field at this time point $t_{10}$, the line OE signal LOE1 changes to "O" and also the field OE signal FOE1 changes to "O". These two levels are latched by the latch circuit 22 when the field pulse FLDP1 comes at the time point $t_{10}$. As a result, the field OE latch signal LFOE1 and the line OE latch signal LLOE1 are both logically "0" (i.e. "E"), so that the exclusive OR gate 26 continues to output the top line ID signal TLID (representative of "O") of the same logical level as that of the preceding field.

Thereafter, when the field pulse FLDP2 is applied to the ½ divider 27 near the time point $t_{11}$, the top line ID signal TLID having the content "O" is loaded. Therefore, the logical level of the line OE signal LOE2 changes with the top line ID signal as the reference, so that the exclusive OR gate 28 outputs the reproduced subcarrier signal PBSC as it is as the return subcarrier signal RSC.

Therefore, the chrominance APC circuit of the VTR continues to be phase-controlled on the basis of the top line ID of the reference video signal $V_{REF}$.

This line OE signal LOE1 and this field OE signal FOE1 are latched by the latch circuit 22 in response to the field pulse FLDP1 generated at the time point $t_{11}$, so that the top line ID signal TLID of logical "1" is outputted from the output terminal of the exclusive OR gate 26.

Thereafter, when the field pulse FLDP2 is applied to the ½ divider 27 near the time point $t_{12}$, the line OE signal LOE2 is switched to the one having the content "E" obtained by inversing the top line ID of the preceding field, so that the exclusive OR gate 23 inverses the logical level of the reproduced subcarrier signal PBSC and outputs it as the return subcarrier signal RSC.

At this moment, since the return subcarrier signal RSC is inversed, the chrominance APC circuit of the VTR is controlled to the same state as where the phase of the chrominance signal of the preceding field is inversed.

At the time point $t_{12}$, the line OE signal LOE1 of logical "E" and the field OE signal FOE1 of logical "O" are both latched by the latch circuit 22 in response to the field pulse FLDP1, so that the exclusive OR gate 26 outputs the OE latch signal LLOE1 without inversion as the top line ID signal TLID.

Thereafter, when the field pulse FLDP2 is applied to the ½ divider 27 near the time point $t_{13}$, a line OE signal LOE2 having a top line ID of "E" is outputted, so that the reproduced subcarrier signal PBSC is inversed by the exclusive OR gate 28 and outputted as the return subcarrier signal RSC to the VTR. Therefore, the VTR controls the chrominance APC circuit of the VTR so as not to inverse the phase of the chrominance signal of the preceding field.

As described above, the time base error corrector shown in FIG. 1 can generate the return subcarrier signal RSC which outputs the chrominance signal having the field ID and the top line ID of the reference video signal $V_{REF}$ as shown in FIG. 4 from the VTR. The input video signal $V_{MIN}$ thus controlled is written in the buffer memory 12 through the analog-to-digital converter 11, read in synchronism with the reference video signal $V_{REF}$, and then outputted as an output video signal $V_{TBC}$ through the digital-to-analog converter 18.

Therefore, it is possible to obtain the chrominance signal whose time base error is corrected and whose phase is in phase with the burst signal of the reference video signal $V_{REF}$.

(2) EMBODIMENT FOR PAL SYSTEM

Operation Principle

In the case of the PAL color television system, the subcarrier is relatively 90 degrees out of phase with the horizontal synchronizing signal HSYNC; that is, there exists a 90-degree offset phase relationship between the two. In addition, in the burst signal, the phase of the V-axis carrier is inversed alternately in sequence for each line from $+V$ axis to $-V$ axis or vice versa. Further, the burst signal is composed by vector composition with the $-U$ axis carrier.

Figure 5:
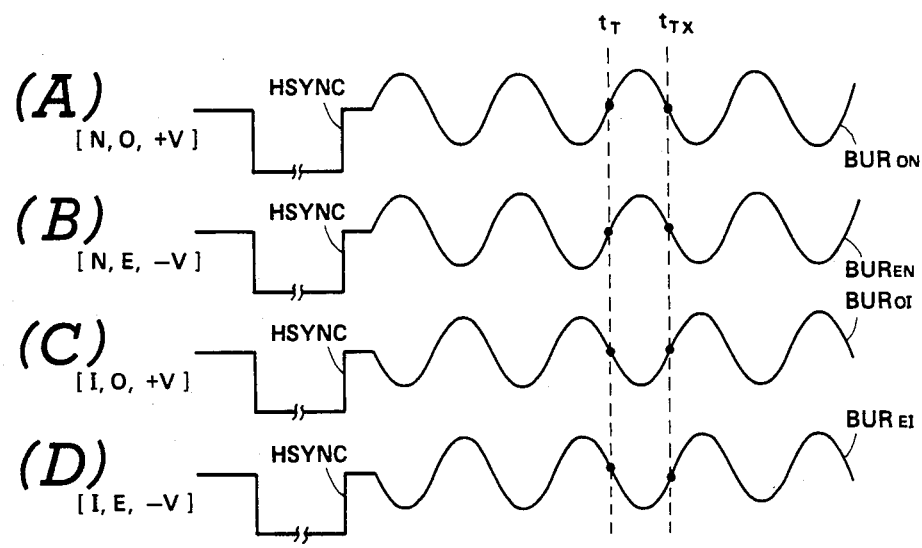
FIG. 5 is a chart showing the relationship between four waveform diagrams each representative of the phase relationship between the horizontal synchronizing signal and the burst signal of an odd line (+V axis) and non-inversion mode N (A or $BUR_{ON}$), an even line (−V axis) and non-inversion mode N (B or $BUR_{EN}$), an odd line (+V axis) and inversion mode I (C or $BUR_{OI}$), and an even line (−V axis) and inversion mode I (D or $BUR_{EI}$) in the reference video signal of the PAL color television system.

Therefore, with respect to the burst signal as shown in FIG. 5, a first burst $BUR_{On}$ (FIG. 5A) having a reference phase formed in accordance with a vector composition of the $-U$ axis and $+V$ axis carriers can be obtained as to the reference line; a second burst signal $BUR_{EN}$ (FIG. 5B) formed in accordance with vector composition of the 90-degree phase shifted $-U$ axis and $-V$ axis carriers can be obtained for the succeeding line; a third burst signal $BUR_{01}$ (FIG. 5C) formed in accordance with vector composition of 180-degree phase shifted $-U$ axis and $+V$ axis carriers can be obtained for the succeeding line; and a fourth burst signal $BUR_{E1}$ (FIG. 5D) formed in accordance with vector composition of 270-degree phase shifted $-U$ axis and $-V$ axis carriers can be obtained for the succeeding line.

After these first to fourth burst signals $BUR_{ON}$ to $BUR_{E1}$ have been obtained, these four burst signals $BUR_{ON}$, $BUR_{EN}$, $BUR_{01}$ and $BUR_{E1}$ appear in sequence repeatedly for each line at the fifth line and after.

For the PAL television signal made up of a chrominance signal switched in sequence in four modes as described above, in the same way as in FIG. 3, the TBC previously determines the line top time point $t_T$(FIG. 5) and controls the read and write addresses in the buffer memory with the address at this time point $t_T$ as the head address of the top line. Therefore, it is possible to define the line identification signal (i.e. line ID) representative of the phase of each line burst signal by synchronizing the top time point $t_T$ with the zero-cross point of the burst signals $BUR_{ON}$, $BUR_{EN}$, $BUR_{01}$, and $BUR_{E1}$.

That is to say, the line ID having the $+V$ axis carrier is defined as an odd mode (i.e. "O"), as shown in FIG. 5A and 5C; the line ID having the $-V$ axis carrier is defined as an even mode (i.e. "E"), as shown in FIGS. 5B and 5D. In addition, when the carrier phase is shifted by 0 and 90 degrees relative to the horizontal synchronizing signal HSYNC as shown in FIGS. 5A and 5B, the line ID is defined as non-inversion mode (i.e. "N"); when the carrier phase is shifted by 180 and 270 degrees relative to the horizontal synchronizing signal HSYNC, the line ID is defined as inversion mode (i.e. "I").

If defined as described above, it is possible to define the line ID of four burst signals $BUR_{ON}$, $BUR_{EN}$, $BUR_{OI}$, and $BUR_{EI}$ by "O" "N", "E" "N", "O" "I", and "E" "I" in sequence. Therefore, if the line ID of the reference video signal $V_{REF}$ is represented on the basis of the above definition, it is possible to represent the phases of the chrominance signals of the sequential lines by the line IDs as "O" "N", "E" "N", "O" "I" and "E" "I", as shown in FIG. 6A.

In contrast with this, the field ID can be represented by "O" and "E" in the same way as in the NTSC system as shown in FIG. 6B.

Here, the ID of the line whose content of the field ID is inversed, that is, the ID of the top line changes so as to cycle every 8 fields as shown in FIG. 6C. Here, the way of change in 8 fields is as follows: the condition that the contents of O/E and N/I of the top line ID are both inversed is that the line ID of the preceding field is "E" and further the content O/E of the top line ID of the preceding field is "E".

In this connection, when the field ID of the preceding field is "O", no change occurs between the top line ID of the preceding field and that of the succeeding field. Further, even if the field ID of the preceding field is "E", where the content O/E of the line ID of the preceding field is "O", although the content O/E of the top line ID of the preceding field is inversed from "O" to "E", the content N/I of the top line ID is not inversed.

Since there exists a continuity in the line ID of the reference video signals $V_{REF}$, it is possible to correctly predict the top line ID of the preceding field on the basis of the content O/E of the field ID and the contents O/E and N/I of the top line ID by making use of this continuity.

By the way, in the case of the PAL system, as shown in FIG. 5, if the top time point $t_T$ is shifted to the adjacent zero-cross point $t_{TX}$, the write address is synchronized with the time point at which the burst signal is phase-shifted by 180 degrees. This indicates that the write address is shifted to the line whose content N/I of the top line ID is inversed. The mutual relationship of the line ID content N/I in the PAL system corresponds to the mutual relationship of the line ID content O/E in the NTSC system. This indicates that the definition of N/I in the PAL system is not absolute. As a result, it is possible to freely replace the line ID content N/I of the video signal read out of the buffer memory with the line ID of the reference video signal $V_{REF}$.

By paying attention to the fact that the reference video signal $V_{REF}$ has the relationship as described above with reference to FIG. 6, it is possible to predict the top line ID of the succeeding field on the basis of the field ID content O/E of the preceding field and the top line ID contents O/E and N/I of the preceding field of the reference video signal $V_{REF}$. Therefore, it is possible to realize the time base error correction operation such that the phase of the chrominance signal included in the output video signal $V_{TBC}$ read from the buffer memory can match the phase of the burst signal of the reference video signal $V_{REF}$ at the top time point of the top line of the succeeding field, if the chrominance signal for writing the reproduced video signal in the buffer memory is so forcibly corrected as to have a top line ID which can match the predicted top line ID.

Figure 2:
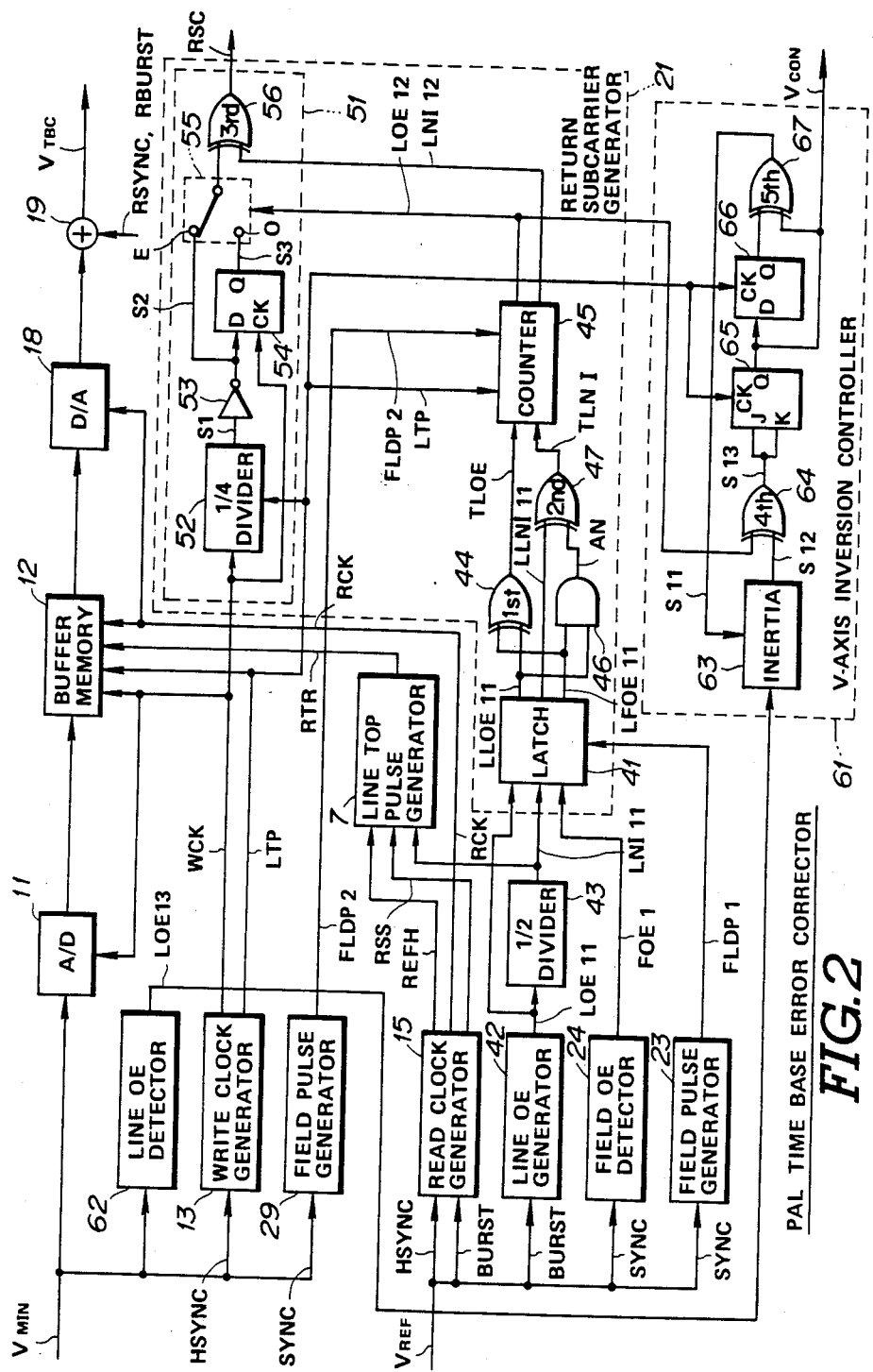
FIG. 2 is a schematic block diagram showing a second embodiment of the chrominance subcarrier phase corrector for a time base corrector applicable to the PAL system.

The time base error corrector (TBC) for the PAL system according to the present invention comprises the system configuration as shown in FIG. 2 so as to be able to realize the above-mentioned operation.

Configuration and Operation of Time Base Error Corrector

In FIG. 2 the same reference numerals have been retained for similar sections which have the same functions in FIG. 1 and any detailed description of them is omitted.

The line ID contents O/E and N/I (FIG. 6A) and the field ID content O/E (FIG. 6B) are latched by a latch circuit 41 of the return subcarrier generator 21 in response to the field pulse signal FLDP1 from the field pulse generator 23.

That is, the line ID content O/E of each line of the reference video signal $V_{REF}$ is detected by a line OE detector 42 on the basis of the burst signal BURST of the reference video signal $V_{REF}$, and the line OE signal LOE11 obtained at its output terminal is given to the latch circuit 41 as a first input signal.

Further, this line OE signal LOE11 is divided by a ½ divider 43, and a line N1 signal LNI11 representative of the line ID content N/I whose logical level is inversed every two lines is given from the ½ divider 43 to the latch circuit 41 as a second input signal.

In addition, the field OE signal FOE1 obtained by the field OE detector 24 is applied to the latch circuit 41 as the third input signal.

Therefore, the line ID (FIG. 6A) and the field ID (FIG. 6B) of the top line of the preceding field are latched by the latch circuit 41. The field OE latch signal LFOE11 and the line OE latch LLOE11 obtained at the output terminal of the latch circuit 41 are supplied to an exclusive OR gate 44. When the field OE latch signal LFOE11 is logically "1" (representative of "E"), the logical level of the line OE latch signal LLOE11 is inversed and is outputted from the output terminal of the gate 44. In contrast with this, when the field OE latch signal LFOE11 is logically "0" (representative of "O"), the line OE latch signal LLOE11 is directly outputted from the output terminal of the gate 44. The output obtained by the exclusive OR gate 44 is applied to a counter 45 as the top line OE signal TLOE.

The operation of this exclusive OR gate 44 represents the content O/E of the top line ID (FIG. 6C). When the field ID of the preceding field is "E", the top line ID of the succeeding field is obtained by inversing the top line ID of the preceding field. In contrast with this, when the field ID of the preceding field is "O", the content of the top line ID of the preceding field is used for the top line ID of the succeeding field as it is. These relationship can be realized by the exclusive OR gate 44.

The line OE latch signal LLOE11 and the field OE latch signal LFOE11 are also given to an AND gate 46. The ANDed output AN is given to an exclusive OR gate 47 as the first input. To this exclusive OR gate 47, the line NI latch signal LLNI11 is given as the second input. When the first input AN is at a logically "1" level, the logical level of the line NI latch signal LLNI11 is inversed and outputted from the output terminal of the gate 47. In contrast with this, when the first input AN is at a logically "0" level, the line NI latch signal LLNI11 is outputted as it is from the output terminal thereof. The output of this exclusive OR gate 47 is supplied to a counter 45 as the top line NI signal TLN1.

Here, the condition that the output AN of the AND gate 46 is logically "1" is that the field ID of the preceding field is logically "1" (representative of "E") and the line OE latch signal LLOE11 is logically "1" (representative "E"). Therefore, when the preceding field ID is "E" and the content O/E of the top line ID of the preceding field is "E", the line NI latch signal LLNI11 (therefore, the content N/I of the top line ID) is inversed by the exclusive OR gate 47 and is outputted as the top line NI signal TLNI. This indicates that when the preceding field ID is "E" and the top line ID of the preceding field is "E", the content N/I of the top line ID of the succeeding field is obtained by inversing the content N/I of the top line ID of the preceding field.

In the case other than the above conditions, the inversion operation of the content N/I of the top line ID never occurs.

That is, first, when the field ID of the preceding field is "E" and the content E/O of the top line ID of the preceding field is "O", secondly, when the field ID of the preceding field is "O" and the content O/E of the top line ID of the preceding field is "E", and thirdly, when the field ID of the preceding field is "O" and the content O/E of the top line ID of the preceding field is "O", the exclusive OR gate 47 does not perform inversion operation, so that the content N/I of the top line ID of the succeeding field takes over the content N/I of the top line ID of the preceding field.

In the same way as in the NTSC system, when the field pulse FLDP2 is outputted from the field pulse generator 29, the counter 45 loads the top line OE signal TLOE and the top line NI signal TLN1 of the preceding field and thereafter performs the count operation with this logical level as its initial condition and with the line top pulse LTP as clocks. Therefore, the logical level is inversed alternately in sequence to output the line OE signal LOE12 and the line NI signal LNI12 having the contents O/E and N/I of the line ID at the top time point $t_T$ of the preceding field of the line ID of the reference video signal $V_{REF}$ as described with reference to FIG. 6.

Figure 7:
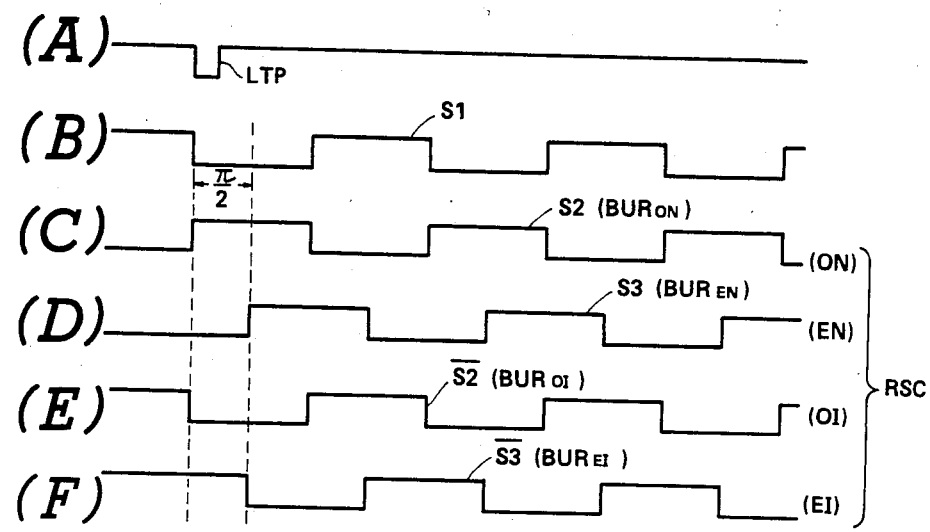
FIG. 7 is a timing chart of waveforms showing various signals generated in the return subcarrier generator shown in FIG. 2.
Figure 8:
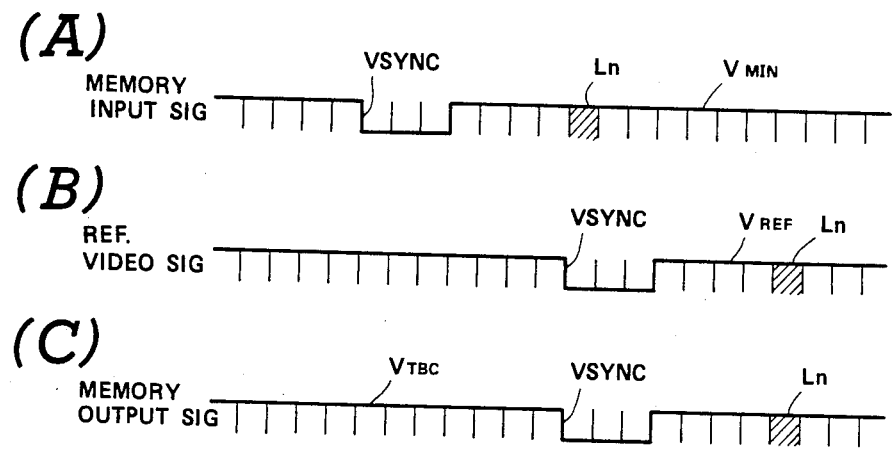
FIG. 8 is a timing chart for assistance in explaining the time relationship between various signals necessary for when the video signals are written in or read out of the buffer memory in response to the reference video signal.

The line OE signal LOE12 and the line NI signal LNI12 are supplied to the return subcarrier signal generator 51. This return subcarrier signal generator 51 receives, through a ¼ divider 52, the write clock signal WCK outputted from the write clock signal generator 13 to form a frequency output S1 having a frequency fsc of the subcarrier as shown in FIG. 7B. The phase of this signal is inversed by an inverter 53 to obtain a frequency signal S2 as shown in FIG. 7C. The ¼ divider 52 receives the line top pulse LTP (FIG. 7A) outputted from the write clock signal generator 13 as a reset signal to reset the frequency signal S1 in to response to the trailing edge of the line top pulse LTP, so that the phase of the succeeding frequency signal S1 is synchronized with the line top pulse LTP.

The frequency signal S2 is supplied to the D flip flop circuit 54. This D flip flop circuit 54 receives the write clock signal WCK as a clock signal to write the input signal applied to the D input. However, since this write clock signal WCK is not passed through the ¼ divider 52, it is possible to obtain a frequency signal S3 90 degrees out of phase with the frequency signal S2 as shown in FIG. 7D at the output terminal of the D flip flop circuit 54.

The frequency signals S2 and S3 are given to an E input terminal and an O input terminal of an OE switch circuit 55 which performs a switching operation in response to the line OE signal LOE12. When the content of the line OE signal LOE12 is "E", the frequency signal S2 of the E input terminal is outputted to the exclusive OR gate 56. In contrast with this, when the content of the line OE signal LOE12 is "O", the frequency signal S3 of the O input terminal is outputted to the exclusive OR gate 56.

The line NI signal LNI12 is supplied to the exclusive OR gate 56. When the content of the line NI signal LNI12 is logically "0" (representative of "N"), the output of the latch circuit 55 is outputted as it is as the return subcarrier signal RSC. In contrast with this, when the line NI signal LNI12 is logically "1" (representative of "I"), the exclusive OR gate 56 inverses the output of the switch circuit 55 and outputs it as the return subcarrier signal RSC.

Therefore, first, when the contents O/E and N/I of the top line ID represented by the line OE signal LOE12 and the line NI signal LNI12 are "O" and "N" respectively, the frequency signal S2 is passed through the switch circuit 55 and outputted as it is as the return subcarrier signal RSC without being inversed by the exclusive OR gate 56. Secondly, when "E" and "N" respectively, the frequency signal S3 is passed through the switch circuit 55 and outputted as it is as the return subcarrier signal RSC without being inversed by the exclusive OR gate 56.

In contrast with this, when the contents of the line OE signal LOE12 and the line NI signal LNI12 are "O" and "I", the frequency signal S2 is passed through the switch circuit 55 and inversed by the exclusive OR gate 56. The resultant inversion signal $\overline{S2}$ (FIG. 7E) is outputted as the return subcarrier signal RSC. Fourthly, when "E" and "I", the frequency signal S3 is passed through the switch circuit 55 and inverted signal $\overline{S3}$ (FIG. 7F) is outputted as the return subcarrier signal RSC.

As described above, the signals S3, $\overline{S2}$, and $\overline{S3}$ 90 by 90 degrees out of phase with respect to the frequency signal S2 (0 phase signal) are selectively outputted as the return subcarrier signal RSC, which correspond to four mode burst signals $BUR_{ON}$, $BUR_{EN}$, $BUR_{OI}$ and $BUR_{EI}$.

Therefore, these return subcarrier signals RSC are received by the chrominance APC circuit, the VTR controls the phase of the chrominance signal so as to match the phase of this return subcarrier signal RSC. Therefore, it is possible to output the chrominance signal having the burst signal whose phase matches that of the burst signal included in the reference video signal $V_{REF}$.

By the way, as described with reference to FIG. 5, in the case of the PAL system, since it is necessary to inversion control the line sequence so that the V-axis subcarrier constituting the burst signal is synchronized with the line ID change, there is provided a V-axis inversion controller 61. In this V-axis inversion controller 61, the line OE detection signal LOE13 detected by a line OE circuit 62 for detecting the content O/E of the line ID of the reproduced video signal $V_{MIN}$ is received by an inertia circuit 63. This inertia circuit 63 is a circuit having a flywheel effect so as not to be subjected to the influence of noise, so that the logical level of the input signal can be inversed in response to the inversion control signal S11. Therefore, when no inversion control signal S11 is generated, the OE signal S12 corresponding to the line OE detection signal LOE13 is supplied to an exclusive OR gate 64.

To this exclusive OR gate 64, the line OE signal LOE12 obtained by the counter 45 in the return subcarrier generator 21 is given. When the content of the OE signal S12 matches the content of the line OE signal LOE12, a match detection signal S13 of logical "0" is given to the J and K input terminals of a JK flip flop circuit 65.

To this JK flip flop circuit 65, the line top pulse LTP outputted from the write clock signal generator 13 is given as a clock signal, so that the content of the match detection signal S13 is written in the J and K input terminals at the top time pont $t_T$ of each line. Here, when the match detection signal S13 is logically "0" representative of the matching, the JK flip flop circuit 65 does not perform inversion operation to output the V-axis inversion control signal $V_{CON}$ having the same logical level as that of the preceding line from the output terminal. In contrast with this, when the match detection signal S13 is logically "1" level representative of the mismatching, the JK flip flop circuit 65 is inversed by the line top pulse LTP to inverse the logical level of the V-axis inversion control signal $V_{CON}$.

This V-axis inversion control signal $V_{CON}$ is given to the U-axis controller of the VTR. When its logical level is at "1", the phase of the V-axis subcarrier of the burst signal outputted from the VTR is inversed. As a result, the phase of the burst signal included in the chrominance signal of the reproduced video signal $V_{MIN}$ is so controlled as to match the phase of the burst signal of the reference video signal $V_{REF}$.

In addition to the above configuration, the V-axis inversion control circuit 61 gives the Q output of the JK flip flop circuit 65 to a D flip flop circuit 66. The Q output thereof and the Q output of the JK flip flop circuit 65 are given to an exclusive OR gate 67, and the output of the exclusive OR 67 is feedbacked to the inertia circuit 63 as the inversion control signal S11.

Therefore, when the JK flip flop circuit 65 is inversion operated because of the mismatching of the line OE signal LOE12 and the OE signal S12, during the time interval for one corresponding line, an input having a different logical level is supplied to the exclusive OR gate 67 to rise the logical level of the inversion control signal S11 to a "1" level. At this moment, the inertia circuit 63 inverses the logical level of the OE signal S12 at the output terminal. By this, the mismatching detection signal S13 of the exclusive OR gate 64 falls to a logical "0" level to inhibit the inversion operation of the JK flip flop circuit 65 in response to the coming line top pulse LTP. As a result, the V-axis inversion control signal $V_{CON}$ keeps the logical level during the succeeding line.

In these conditions, when the content O/E of the line ID of the burst signal of the reproduced video signal $V_{MN}$ matches the content O/E of the line ID of the burst signal of the reference video signal $V_{REF}$ on the basis of the inversion control of the V axis by the VTR, the logical level of the line OE detection signal LOE13 is inversed and therefore the logical level of the OE signal S12 of the inertia circuit 63 is inversed. At this moment, the exclusive OR gate 64 detects the mismatching to drop the logical level of the mismatch detection signal S13 to "1", so that the JK flip flop circuit 65 is inversion operated. Therefore, the logical level of the V-axis inversion control signal $V_{CON}$ returns to the non-inversion logical level of the VTR (i.e. "0"), so that the phase of the chrominance signal outputted from the VTR is controlled at the state where the phase is not inverted.

At this moment, since the JK flip flop circuit 65 is inversion operated, the output of the exclusive OR gate 67 rises from a logical "0" to a logical "1", and the "1" signal is supplied to the inertia circuit 63 as the inversion control signal S11. As a result, the logical level of the OE signal S12 of the inertia circuit 63 is returned to such a state as to match the logical level of the line OE signal LOE12. As described above, it is possible to match the phase of the V-axis subcarrier included in the reproduced video signal $V_{MIN}$ outputted from the VTR with the V-axis carrier signal included in the reference video signal $V_{REF}$.

In the system configuration as shown in FIG. 2, with respect to the chrominance signal of the PAL system it is possible to readily obtain the time base error corrector which can perform the phase rotation and inversion operation matching the phase rotation and the V-axis inversion of the subcarrier of the reproduced video signal $V_{MIN}$ obtained from the VTR.

(3) OTHER EMBODIMENTS

In the above description, the embodiments have been described of the case where the present invention is applied to the TBC for generating the return subcarrier signal supplied to the VTR when the VTR is operated in the subcarrier return mode. However, without being limited to these, it is possible to widely apply the present invention to the case where there exists a need for matching the phase of the chrominance signal included in he video signal to be processed with the phase of the burst signal included in the reference video signal $V_{REF}$.

Further, in the above-mentioned embodiments, the phase of the chrominance signal to be written in the buffer memory has been determined by predicting it on the basis of the top line ID of the preceding field. However, it is also possible to predict the phase on the basis of the top line ID of a field which is a plurality of fields before the present field.

Effect of the Invention

As described above, in the present invention, on the basis of the fact that the burst signal of the reference video signal has a continuity and is switched in accordance with a predetermined mode, when the video signal to be processed is written into the buffer memory, the matching and mismatching of the reference video signal caused when the written video signal is read is predicted in advance, and the phase of the subcarrier included in the video signal to be written on the basis of the predicted result is changed so as to match the reference signal. Therefore, when the time base error is corrected by reading the video data from the buffer memory in synchronism with the reference video signal, it is possible to perform the correction in such a way that there exists no mismatching portion of the read video signal with the reference video signal in phase.

What is claimed is:

1. A time base error corrector for outputting an output video signal having no time base error by means for writing an input video signal in a buffer memory in response to a synchronizing signal included in the input video signal and by means for reading the written video signal from the buffer memory in response to a synchronizing signal included in a reference video signal, which comprises:

means for controlling phase of a chrominance subcarrier included in the input video signal, before the input video signal is written in the buffer memory, so that the phase of a chrominance subcarrier included in the read video signal matches that of a chrominance subcarrier included in the reference video signal when the video signal written in the buffer memory is read therefrom in response to the reference video signal, wherein in the case of a National Television System Committee (NTSC) color television system, said chrominance subcarrier phase controlling means is a return subcarrier generating means for generating a first return subcarrier signal RSC when a succeeding top line identification of a succeeding field, representative of the relative phase relationship between the burst signal and the synchronizing signal at a top horizontal line of said field, is determined to be an odd number but a second return subcarrier signal RSC when the succeeding top line identification is determined to be an even number both by predicting the succeeding top line odd/even (O/E) identification on the basis of an O/E content of a preceding field identification of a preceding field, representative of an odd and even number of the field, and an O/E content of the preceding field top line identification.

2. The time base error corrector as set forth in claim 1, wherein said return subcarrier generating means comprises:

(a) latch means for latching a content of a line OE signal LOE1 representative of a preceding field line identification and a content of a field OE signal FOE1 representative of a preceding field identification both in response to a field pulse FLDP1 generated on the basis of a synchronizing signal SYNC included in the reference video signal $V_{REF}$ and for outputting a latched line OE signal LLOE1 representative of the preceding top line identification and a latched field OE signal LFOE1 representative of the preceding field identification;

(b) first exclusive OR gate means responsive to the latched line OE signal LLOE1 and the latched field OE signal LFOE1 for outputting a top line identification signal TLID such that the latched top line OE signal LLOE1 is inversed in logical level when the latched field OE signal LFOE1 represents an even field but not inversed when represents an odd field;

(c) ½ divider means responsive to the top line identification signal TLID, a line top pulse LTP serving as a clock, and a field pulse FLDP2 serving as a loading signal of the top line identification signal TLID at each field start time point, for outputting a top line OE signal LOE2 having an initial logical level set to that of the top line identification signal TLID and subsequently inversed in response to the line top pulse LTP;

(d) ¼ divider means responsive to a write clock WCK and the line top pulse LTP for generating a reproduced subcarrier signal PBSC having a subcarrier frequency $f_{sc}$ in synchronism with the line top pulse LTP; and (e) second exclusive OR gate means responsive to the line OE signal LOE2 and the reproduced subcarrier signal PBSC for outputting a return subcarrier signal RSC such that the reproduced subcarrier signal PBSC is inversed in logical level when the top line OE signal LOE2 represents an even line identification but is not inversed when represents an odd line identification, the above return subcarrier signal RSC being returned to an automatic phase controller for chrominance signal to control phase of the chrominance signal included in the input video signal to that of the return subcarrier signal RSC.

3. A time base error corrector for outputting an output video signal having no time base error by means for writing an input video signal in a buffer memory in response to a synchronizing signal included in the input video signal and by means for reading the written video signal from the buffer memory in response to a synchronizing signal included in a reference video signal, which comprises:

means for controlling phase of a chrominance subcarrier included in the input video signal, before the input video signal is written in the buffer memory, so that the phase of a chrominance subcarrier included in the read video signal matches that of a chrominance subcarrier included in the reference video signal when the video signal written in the buffer memory is read therefrom in response to the reference video signal, wherein in the case of phase alternation by a line color television system, said chrominance subcarrier phase controlling means is a return subcarrier generating means for generating a first return subcarrier signal $S_2$ when two preceding top line identifications of preceding fields, representative of the relative phase relationship between the burst signal and the synchronizing signal at the top lines of said fields, are determined to be an odd number and a non-inversion mode, a second return subcarrier signal $S_3$ 90 degrees out of phase with respect to the first signal $S_2$ when two preceding top line identifications are determined to be an even number and a non-inversion mode, a third return subcarrier signal $S_2$ when the two preceding top line identifications are determined to be an odd number and an inversion mode, and a fourth return subcarrier signal $S_3$ when to two preceding top line identifications are determined to be an even number and an inversion mode, all by predicting the succeeding top line odd/even (O/E) identification and the succeeding top line inversion/non-inversion (I/N) identification on the basis of an O/E content of the preceding field identification of a preceding field, representative of an odd or even number of the field, and the O/E and I/N contents of the preceding field top line identifications.

4. The time base error corrector as set forth in claim 3, wherein said return subcarrier generating means comprises:

(a) latch means for latching a content of a line OE signal LOE11 representative of a preceding field top line O/E identification, a contend of a top line NI signal LNI11 representative of a preceding field top line N/I identification and a content of a field OE signal FOE1 representative of a preceding field identification, all in response to a field pulse FLDP1 generated on the basis of a synchronizing signal SYNC included in the reference video signal $V_{REF}$ and for outputting a latched line OE signal LLOE11 representative of a first top line identification, a latched line NI signal LLNI11 representative of a second top line identification, and a latched field OE signal LFOE11 representative of a field identification;

(b) first exclusive OR gate means responsive to the latched line OE signal LLOE11 and the latched field OE signal LFOE11 for outputting a top line identification signal TLOE such that the latched line OE signal LLOE11 is inversed in logical level when the latched field OE signal LFOE11 represents an even field but not inversed when represents an odd field;

(c) AND gate means responsive to the latch line OE signal LLOE11 and the latched field OE signal LFOE11 for outputting an ANDed signal AN;

(d) second exclusive OR gate means responsive to the latched line NI signal LLNI11 and the ANDed signal AN for outputting a top line NI signal TLNI such that the latched line NI signal LLNI11 is inversed in logical level when the latched field OE signal LFOE11 represents an even field and the latched line OE signal LLOE11 represents an even field but not inversed in other conditions;

(e) counter means responsive to the top line identification signal TLOE, the top line NI signal TLNI, a line top pulse LTP serving as a clock, and a field pulse FLDP2 serving as a loading signal of the top line identification signal TLOE and the top line NI signal TLNI at each field start time point, for outputting a line OE signal LOE12 having an initial logical level set to that of the top line identification signal TLOE and a line NI signal LNI12 having an initial logical level set to that of the top line NI signal TLNI, both being inversed subsequently in response to the line top pulse LTP;

(f) ¼ divider means responsive to a write clock WCK and the line top pulse LTP for generating a first signal $S_1$ having a subcarrier frequency $f_{sc}$ in synchronism with the line top pulse LTP;

(g) inverter means for inverting the first signal $S_1$ and outputting the second signal $S_2$;

(h) D flip flop means responsive to the write clock WCK and the second signal $S_2$ for outputting a third signal $S_3$ having a phase 90 degrees out of phase with respect to the second signal $S_2$;

(i) OE switch means responsive to the line OE signal LOE12 for outputting the second signal $S_2$ when a content of the line OE signal LOE12 represents an even number but the third signal $S_3$ when represents an odd number; and (j) third exclusive OR gate means responsive to the output $S_2$ or $S_3$ of said OE switch means and the line NI signal LNI12 for outputting a return subcarrier signal RSC such that the output $S_2$ or $S_3$ of said OE switch is not inversed when the line NI signal LNI12 represents a non-inversion mode but inversed when represents an inversion mode; the above return subcarrier signal RSC being returned to an automatic phase controller for chrominance signal to control phase of the chrominance signal included in the input video signal to that of the return subcarrier signal RSC.

5. The time base error corrector as set forth in claim 4, which further comprises means for generating a V-axis inversion control signal $V_{CON}$ to match a burst signal phase and a V-axis subcarrier phase of the reproduced input video signal $V_{MIN}$ with those of the reference video signal $V_{REF}$.

6. The time base error corrector as set forth in claim 5, wherein said V-axis inversion control signal generating means is a V-axis inversion controller means which comprises:

(a) inertia circuit mean having a flywheel effect and responsive to a feedbacked inversion control signal $S_{11}$ and a line OE detection signal LOE13 for outputting an OE signal $S_{12}$ corresponding to the line OE detection signal LOE13 in response to an absence of the inversion control signal $S_{11}$ but corresponding to the inverted line OE detection signal LOE13 in response to a presence of the inversion control signal $S_{11}$;

(b) fourth exclusive OR gate means responsive to the OE signal $S_{12}$ and the line OE signal LOE12 outputted from said counter means for generating a match detection signal $S_{13}$ when the OE signal $S_{12}$ matches the line OE signal LOE12 in logical level;

(c) JK flip flop circuit means responsive to the match detection signal $S_{13}$ and the line top pulse LTP for outputting a V-axis inversion control signal $V_{CON}$ the same as that of the preceding line when the signal $S_{13}$ represents a matching but a V-axis inversion control signal $V_{CON}$ inverted by the line top pulse LTP when the signal $S_{13}$ represents a mismatching;

(d) flip flop circuit means responsive to the V-axis inversion control signal $V_{CON}$ and the line top pulse LTP for outputting a signal having a different logical level for one line time interval when said flip flop circuit means outputs an inverted V-axis inversion control signal $V_{CON}$; and (e) fifth exclusive OR gate means responsive to the signal from said flip flop circuit means and the V-axis inversion control signal $V_{CON}$ for outputting the feedbacked inversion control signal $S_{11}$ to said inertia means to keep the successive V-axis inversion control signal $V_{CON}$ at the same logical level, said V-axis inversion control signal $V_{CON}$ being applied to a V-axis control circuit in a video tape recorder to inverse a phase of V-axis subcarrier of a burst signal so that a burst signal phase and a V-axis subcarrier phase of the reproduced input video signal match those of the reference video signal $V_{REF}$.

* * * * *